United States Patent
Gastineau et al.

(10) Patent No.: US 11,488,117 B2
(45) Date of Patent: Nov. 1, 2022

(54) SYSTEMS AND METHODS FOR MANAGING ASSOCIATIONS BETWEEN DAMAGED PARTS AND NON-REUSABLE PARTS IN A COLLISION REPAIR ESTIMATE

(71) Applicant: Mitchell International, Inc., San Diego, CA (US)

(72) Inventors: Jerry Gastineau, San Diego, CA (US); Greg MacLean, San Diego, CA (US); Randy Susana, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 0 days.

(21) Appl. No.: 17/005,237

(22) Filed: Aug. 27, 2020

(65) Prior Publication Data

US 2022/0067668 A1    Mar. 3, 2022

(51) Int. Cl.
| | |
|---|---|
| *G06Q 10/00* | (2012.01) |
| *B60S 5/00* | (2006.01) |
| *G07C 5/08* | (2006.01) |
| *G06Q 40/08* | (2012.01) |

(52) U.S. Cl.
CPC .............. *G06Q 10/20* (2013.01); *B60S 5/00* (2013.01); *G07C 5/0808* (2013.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 5,432,904 A | * | 7/1995 | Wong .................... | G06Q 10/04 701/29.3 |
| 5,839,112 A | * | 11/1998 | Schreitmueller ....... | G06T 17/00 705/4 |
| 7,502,772 B2 | | 3/2009 | Kidd et al. | |
| 7,698,086 B2 | | 4/2010 | Kidd et al. | |
| (Continued) | | | | |

FOREIGN PATENT DOCUMENTS

| | | | | |
|---|---|---|---|---|
| CN | 110245267 A | * | 9/2019 | ............. G06F 16/74 |
| EP | 3200139 A1 | * | 2/2017 | ............. G06Q 30/00 |
| (Continued) | | | | |

OTHER PUBLICATIONS

I-Car.com: "One-Time-Use Parts and Fasteners: Toyota/Lexus" https://rts.i-car.com/collision-repair-news/one-time-use-parts-and-fasteners-toyota-lexus.html (Oct. 18, 2017) (Year: 2017).*

(Continued)

*Primary Examiner* — Paul R Fisher

(57) ABSTRACT

Systems and methods are provided for automating the process of determining non-reusable parts associated with replacement or repair of a primary part of a vehicle involved in a collision event. The primary parts to be repaired may be indicated in repair estimate record. Notably, replacement of some primary parts may require replacement of certain non-reusable parts (NRPs) that were not damaged during the collision event and are not identified as such. The method determines which NRPs are required to be replaced when repairing the primary damaged part by using repair documents specifying repair instructions for repairing the primary part. Further, the repair estimate record is updated to include the information related to the primary pars and their associated NRPs.

21 Claims, 9 Drawing Sheets

(56) References Cited

U.S. PATENT DOCUMENTS

| | | | |
|---|---|---|---|
| 8,019,629 | B1 | 9/2011 | Medina, III et al. |
| 8,160,904 | B1 | 4/2012 | Smith |
| 8,260,639 | B1 | 9/2012 | Medina, III et al. |
| 8,712,806 | B1 | 4/2014 | Medina, III et al. |
| 9,208,526 | B1* | 12/2015 | Leise ............... G06Q 30/0185 |
| 9,218,626 | B1 | 12/2015 | Haller, Jr. et al. |
| 9,721,400 | B1 | 8/2017 | Oakes, III et al. |
| 9,846,093 | B2 | 12/2017 | Smith |
| 10,319,035 | B2 | 6/2019 | Nelson et al. |
| 10,339,728 | B1 | 7/2019 | Oakes, III et al. |
| 10,360,601 | B1* | 7/2019 | Adegan ............ G06Q 30/0283 |
| 10,410,439 | B1 | 10/2019 | Gingrich et al. |
| 10,510,142 | B1 | 12/2019 | Dohner et al. |
| 10,922,726 | B1 | 2/2021 | Nelson et al. |
| 10,949,814 | B1 | 3/2021 | Nelson et al. |
| 2005/0125261 | A1* | 6/2005 | Adegan ................ G06Q 40/08 |
| | | | 705/4 |
| 2011/0313951 | A1* | 12/2011 | Cook .................. G06Q 10/04 |
| | | | 705/400 |
| 2014/0122130 | A1 | 8/2014 | Kelly et al. |
| 2014/0279169 | A1* | 9/2014 | Leos ................... G06Q 10/20 |
| | | | 705/26.4 |
| 2016/0178465 | A1 | 6/2016 | Smith et al. |
| 2016/0371785 | A1* | 12/2016 | Bray ................ G06Q 30/0631 |
| 2017/0293894 | A1* | 10/2017 | Taliwal ............... G06V 10/462 |
| 2018/0260793 | A1* | 9/2018 | Li ......................... G06N 7/005 |
| 2018/0293552 | A1* | 10/2018 | Zhang ..................... G06N 3/02 |
| 2018/0300576 | A1 | 10/2018 | Dalyac et al. |
| 2018/0350163 | A1* | 12/2018 | Pofale ................. G07C 5/0808 |
| 2019/0073641 | A1* | 3/2019 | Utke .................... G06K 9/6271 |

FOREIGN PATENT DOCUMENTS

| | | | | |
|---|---|---|---|---|
| WO | WO0161583 | A1 * | 8/2001 | ............ G06F 17/60 |
| WO | WO2008030360 | A2 * | 3/2008 | |
| WO | WO2019070290 | A1 * | 4/2019 | ............ G01M 15/10 |

OTHER PUBLICATIONS

Ronald Montoya, Edmonds.com: "VIN Lookup: How to Decode Your VIN" https://www.edmunds.com/how-to/how-to-quickly-decode-your-vin.html (Jul. 19, 2019) (Year: 2019).*

John Huetter, "Anderson draws auto body shops attention to one-time-use Nissan parts", https://www.repairerdrivennews.com/2018/05/29/anderson-draws-auto-body-shops-attention-to-one-time-use-nissan-parts/, May 29, 2018 (Year: 2018).*

Mitchell an Enlyte Company, "10 Tips Every Estimator Should Be Following" https://www.mitchell.com/insights/auto-physical-damage/articles/10-tips-every-estimator-should-be-following , Sep. 7, 2018 (Year: 2018).*

Markel, drew. "2007-2013 Toyota Tundra." Brake & Front End 86.3 (2014): 20(2). ProQuest. Web. May 16, 2022 (Year: 2014).*

"Toyota and Mitchell Partner to Supply Estimating Tool for Collision Repair Industry." Professional Services Close-Up, Nov. 16, 2013, p. n/a. ProQuest. Web. May 16, 2022 (Year: 2013).*

* cited by examiner

SYSTEMS AND METHODS FOR MANAGING ASSOCIATIONS BETWEEN DAMAGED PARTS AND NON-REUSABLE PARTS IN A COLLISION REPAIR ESTIMATE

TECHNICAL FIELD

The present disclosure is generally related to systems and methods for managing associations between primary damaged parts and non-reusable use parts in a collision repair estimate, and more particularly, some embodiments relate to a systems and methods for implementing the same.

SUMMARY

In accordance with one or more embodiments, various features and functionality can be provided for managing associations between damaged parts and non-reusable parts in a collision repair estimate.

In some embodiments, a method may receive at least one repair estimate record specifying one or more primary parts of a vehicle affected in a collision event. The repair estimate record may be received from a data repository.

In some embodiments, the method may extract vehicle information from the repair estimate record. Vehicle information may include a year, a make, a model, and an engine of the vehicle.

In some embodiments, the method may receive one or more repair documents specifying instructions for repairing the one more primary parts of the vehicle specified by the at least one repair estimate record. The repair documents may be received from a data repository. For example, receiving the repair documents may include determining the repair document associated with the at repair estimate records based on the vehicle information.

In some embodiments, the method may determine one or more non-reusable parts used to repair the one or more primary parts. For example, the method may use instructions provided by the one or more repair documents for repairing the one more primary parts of the vehicle when determining the or more non-reusable parts. In some embodiments, wherein the primary part is damaged during the collision event.

In some embodiments, the primary part may be damaged during the collision event, while the non-reusable part may be a part that has not been damaged during the collision event. In some embodiments, repairing the vehicle affected in the collision event includes replacement of the primary part and replacement of the non-reusable part.

In some embodiments, the method may record an association between the primary part and each non-reusable part in the data repository.

In some embodiments, the method may generate an updated repair estimate record. For example, the updated repair estimate record may specify the one or more non-reusable parts associated with the at least one primary part of the vehicle affected in the collision event.

In some embodiments, the method may extract vehicle information from the at least one repair estimate records. Vehicle information may include a year, a make, a model, and an engine of the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION

Figure 1:
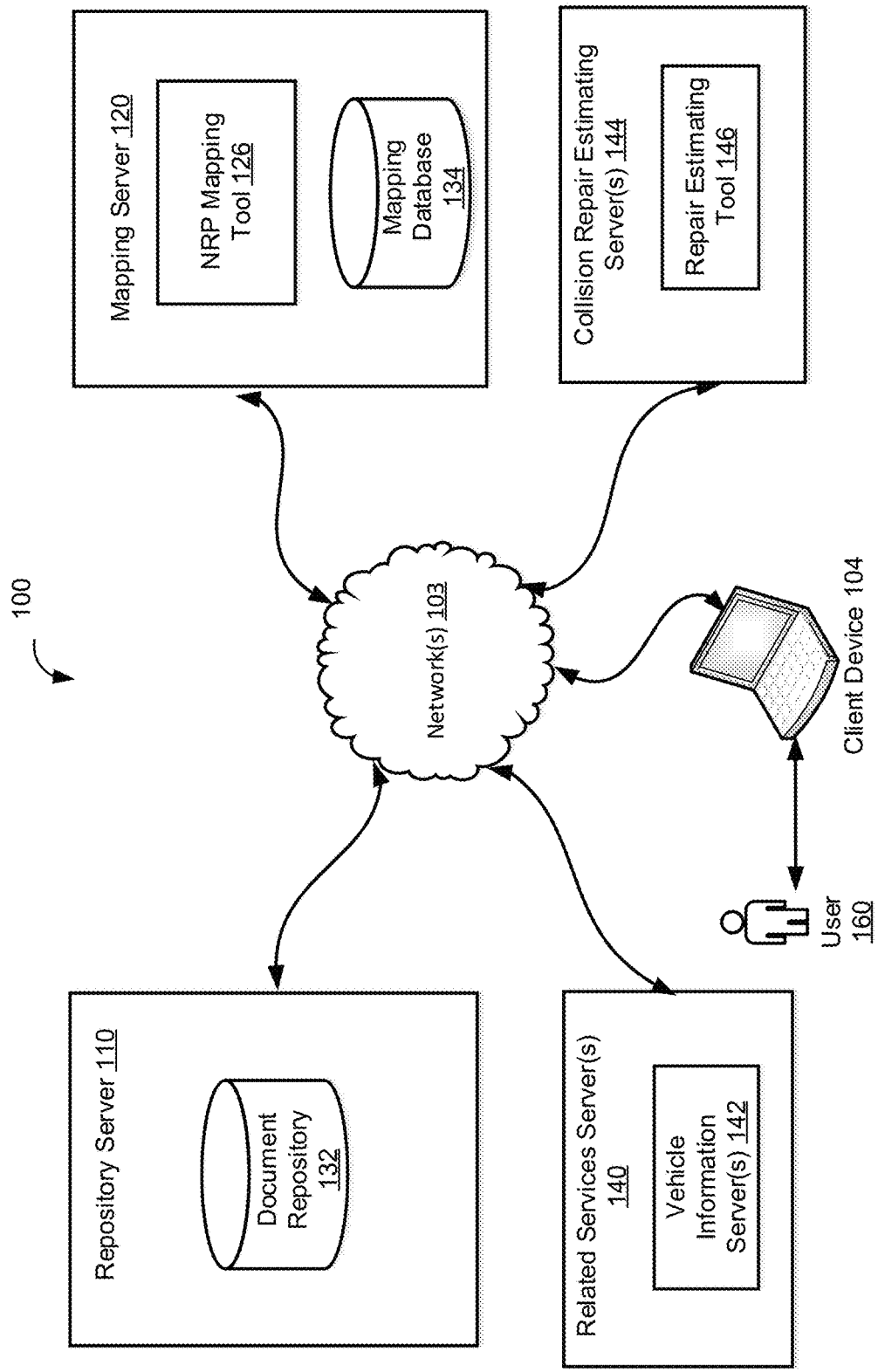
FIG. 1 illustrates an example automated non-reusable part association system, according to an implementation of the disclosure.

Described herein are systems and methods for managing associations between damaged parts and non-reusable parts in a collision repair estimate. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

The automotive repair process relies on a collision repair estimate document for providing information related to parts and/or labor operations that need to be performed during the repair. The collision repair estimates are generated by incorporating input and review from multiple parties involved. A conventional estimating process begins with one party, for example an estimator in a repair shop, generating an estimate identifying damaged parts. For example, the repair estimate document may be generated by adding one or more repair lines to the repair estimate record. Each repair line may represent a phase of the vehicle repair. For example, one line might represent repair of the vehicle bumper, while another line may represent replacements of a headlamp assembly. Subsequently, a repair technician performing the repairs would then reference publications by Original Equipment Manufacturers (OEMs) in order to obtain specific details related to individual parts and/or operations that must be performed when repairing damage associated with each repair line of the repair estimate document.

OEMs generate repair manuals which include technical information used to service and maintain a vehicle (e.g., repair instructions, diagnostic information, diagrammed repair and replacement procedures, electrical diagrams and training information) specific to Year, Make, Model and Engine (YMME). In addition to providing detailed repair instructions that ensure accurate and compliant vehicle repair, these OEM repair documents often call for specific parts or tools by using an OEM part number, simplifying the ordering process. For example, during a repair of a left front fender in a GM vehicle, the repair technician may be referencing a particular set of documents for that specific vehicle.

Repairing damage indicated in each repair line may include replacing specific parts. However, replacement of some parts (i.e., primary parts) may require replacement of certain auxiliary, one-time use parts or non-reusable parts (NRPs) that have not been identified as damaged. That is because a non-reusable part is a replacement part on the vehicle that the OEM recommends replacing after it has been removed during the repair process. (e.g., during the repair of a damaged part). However, often the NRPs are not identified in the repair estimate as being damaged due to their largely axillary function. For example, a labor operation indicating replacement of a suspension component may not include the replacement of one-time use fasteners, which stretch during tightening, which cannot be re-used and must be repurchased during suspension replacement. By not including the fasteners in the repair estimate, results in an inaccurate estimate. Furthermore, in the event the suspension being repaired without replacing the fasteners, may cause the repairs to not be performed adequately. Thus, even if the repair estimate lines can be associated with individual OEM repair documents, identifying individual parts, the absence of associations between the damaged parts and the NRPs required to be replaced during repair the damage, may result in the repair estimate being incomplete, as alluded to above. Accordingly, is necessary to link the operations of the repair estimate to both the damaged parts and the NRPs, which may not be directly affected by the collision damage to generate a complete repair estimate.

Embodiments of the disclosed technology provide a system and method for managing associations between damaged parts and non-reusable parts during a collision repair estimate process. In particular, associations between parts, as identified in a labor operation, and NRPs are determined by the system. By virtue of creating these one-to-one (i.e., one labor operation to one damaged part) and one-to-many (i.e., one damaged part to many NRPs) dependencies, allows the system to identify any NRPs that are required to be replaced during the labor operation for repairing the damaged identified in the repair estimate.

The associations between damaged parts, identified in a labor operation, and NRPs may be determined automatically. The process for automatically determining the associations between damaged parts and NRPs may utilize corresponding repair procedure documents, for example, such as those published by OEM and related to the damaged vehicle. For example, the system may use vehicle information to identifying corresponding OEM repair procedures for the damaged part. Upon analyzing OEM repair procedures, the system identifies associated NRPs and generates associations between the labor operation, the damaged part identified in the labor operation, and the NRPs required to complete the repair of the damaged part. The associations may be recorded in a relational database allowing subsequent use during the repair estimate process. In some embodiments, machine learning models may be employed to determine associations between damaged parts and NRPs, as described in detail below. In other embodiments, manually (e.g., by a user with specific knowledge of vehicles and vehicle repair processes)

System

FIG. 1 illustrates an automated non-reusable part association system 100 according to some embodiments of the disclosed technology. In some embodiments, system 100 may include a repository server 110, a mapping server 120, a one or more related services server(s) 140 (e.g., vehicle information server(s) 142), a collision repair estimating server(s) 144, and other such similar servers), a network 103, and a client computing device 104. A user 160 may be associated with client computing device 104 as described in detail below. Additionally, system 100 may include other network devices such as one or more routers and/or switches.

In some embodiments, client computing device 104 may include a variety of electronic computing devices, for example, a smartphone, a tablet, a laptop, a display, a mobile phone, a computer wearable device, such as smart glasses, or any other head mounted display device, or a combination of any two or more of these data processing devices, and/or other devices.

Repository Server

In some embodiments, repository server 110 may transmit and receive information to and from client computing device 104, a mapping server 120, a one or more related services server(s) 140 (e.g., vehicle information server(s) 142), a collision repair estimating server(s) 144, and/or other servers via network 103. For example, a communication interface of the repository server 110 may be configured to operatively couple and communicate between document repository 132, client computing device 104, a mapping server 120, a one or more related services server(s) 140 (e.g., vehicle information server(s) 142), a collision repair estimating server(s) 144, which are all coupled together by the communication network(s) 103.

In some embodiments, repository server 110 may be a standalone device or integrated with one or more other devices or apparatuses, such as one or more of the storage devices, for example. For example, repository server 110 may include or be hosted by one of the storage devices, and other arrangements are also possible.

Mapping Server

In some embodiments, mapping server 120 may transmit and receive information to and from client computing device 104, one or more repository server 110, vehicle information server 142, repair estimating server 144, and/or other servers via network 103. For example, a communication interface of the mapping server 120 may be configured to operatively couple and communicate between document repository 132, mapping database 134, client computing device 104, repository server 110, vehicle information servers 140, repair estimating server 144, which are all coupled together by the communication network(s) 103.

In some embodiments, NRP mapping tool 126 may access document repository 132 and mapping databases 134 over a network 130 such as the Internet, via direct links, and the like. In some embodiments, mapping server 120 may be a standalone device or integrated with one or more other devices or apparatuses, such as one or more of the storage devices, for example. For example, mapping server 120 may include or be hosted by one of the storage devices, and other arrangements are also possible.

For example, mapping server 120 may include NRP mapping tool 126. In some embodiments, NRP mapping tool 126, which may be implemented as one or more software packages executing on one or more mapping server 120 computers. For example, a client application implemented on one or more client computing device 104 as client mapping tool application. In some embodiments, NRP mapping tool 126 may be a server application, a server module of a client-server application, or a distributed application. In some embodiments, NRP mapping tool 126 may be implemented using a combination of hardware and software. The application(s) can be implemented as modules, engines, or components of other application(s). Further, the application(s) can be implemented as operating system extensions, module, plugins, or the like.

Related Services Server

In some embodiments, related services server 140 may include vehicle information server 142 configured to store and/or manage vehicle information associated with a damaged vehicle. For example, vehicle information may include vehicle identification information, such as vehicle identification number (VIN), make, model, and optional modifications (e.g., sub-model and trim level), date and place of manufacture, and similar information related to a damaged vehicle. Additionally, related services server 140 may include repair estimating server 144 configured to store, manage, and process information related completed estimates, estimates in process, configured to store data related to repair estimating data maintained by the collision repair entity or the automotive. In some embodiments, repair estimating server 144 may be configured to communicate with third-party services (e.g., automotive insurance carriers) to request and receive data regarding parts, part costs, labor, labor costs, and such similar data related to a particular repair event.

In some embodiments, each of repository server 110, mapping server, 120, related services server 140, vehicle information server 142, and collision repair estimating server 144 may include any type of computing device that can be used to interface with repository server 110 and/or cataloging tool 116, document repository 132, repository server 120, NRP mapping tool 126, mapping databases 134, vehicle information servers 140, and collision repair estimating servers 144, and client computing device tool 104. For example, each of mapping server, 120, related services server 140, vehicle information server 142, and collision repair estimating server 144 may include a processor, a memory, and a communication interface, which are coupled together by a bus or other communication link, although other numbers and/or types of network devices could be used. In some embodiments, each of related services server 140, vehicle information server 142, and collision repair estimating server 144 may also include a database.

System Architecture

In some embodiments, repository server 110, a mapping server 120, a one or more related services server(s) 140 (e.g., vehicle information server(s) 142), a collision repair estimating server(s) 144, and or other components may be a single device. Alternatively, a plurality of devices may be used. For example, the plurality of devices associated with mapping server 120, related services server 140, and repair estimating server 144 may be distributed across one or more distinct network computing devices that together comprise mapping server 120, one or more related services server 140, vehicle information server 142, and repair estimate server 144.

In some embodiments, repository server 110, mapping server, 120, related services server 140, vehicle information server 142, and collision repair estimating server 144 may not be limited to a particular configuration. Thus, in some embodiments, repository server 110, mapping server, 120, related services server 140, vehicle information server 142, and collision repair estimating server 144 may contain a plurality of network devices that operate using a master/slave approach, whereby one of the network devices operate to manage and/or otherwise coordinate operations of the other network devices. Additionally, in some embodiments, repository server 110, mapping server, 120, related services server 140, vehicle information server 142, and collision repair estimating server 144 may comprise different types of data at different locations.

In some embodiments, repository server 110, mapping server, 120, related services server 140, vehicle information server 142, and collision repair estimating server 144 may operate as a plurality of network devices within a cluster architecture, a peer-to-peer architecture, virtual machines, or within a cloud architecture, for example. Thus, the technology disclosed herein is not to be construed as being limited to a single environment and other configurations and architectures are also envisaged.

Although the exemplary network environment 100 with client computing device 104, repository server 110, mapping server, 120, related services server 140, vehicle information server 142, and collision repair estimating server 144, and network(s) 103 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment, such as client computing device 104, repository server 110, mapping server, 120, related services server 140, vehicle information server 142, and collision repair estimating server 144 may be configured to operate as virtual instances on the same physical machine. In other words, one or more of client computing device 104, repository server 110, mapping server, 120, related services server 140, vehicle information server 142, and collision repair estimating server 144 may operate on the same physical device rather than as separate devices communicating through communication network(s). Additionally, there may be more or fewer devices than client computing device 104, repository server 110, mapping server, 120, related services server 140, vehicle information server 142, and collision repair estimating server 144.

In addition, two or more computing systems or devices can be substituted for any one of the systems or devices, in any example set forth herein. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including, by way of example, wireless networks, cellular networks, PDNs, the Internet, intranets, and combinations thereof.

Even further, the application(s) may be operative locally on the device or in a cloud-based computing environment. The application(s) can be executed within or as virtual machine(s) or virtual server(s) that may be managed in a cloud-based computing environment. Also, the application(s), and even the repair management computing device itself, may be located in virtual server(s) running in a cloud-based computing environment rather than being tied to one or more specific physical network computing devices. Also, the application(s) may be running in one or more virtual machines (VMs) executing on the repair management computing device.

NRP Mapping Process Overview

Figure 2A:
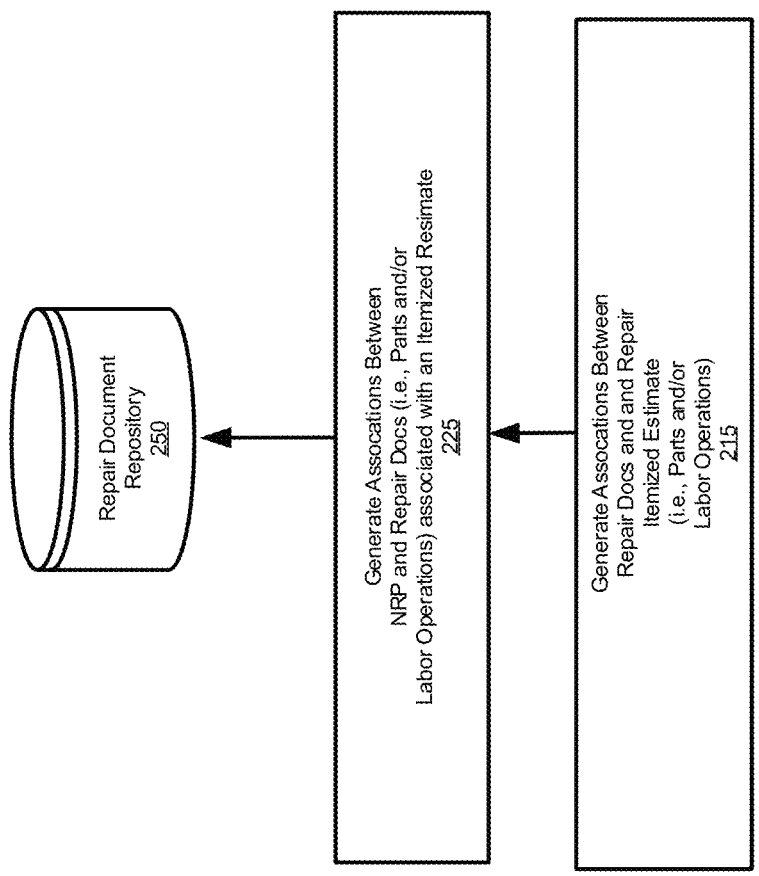
FIG. 2A illustrates an example processes for updating repair document repository, according to an implementation of the disclosure.

FIG. 2A illustrates a processes for updating a repair document repository (e.g., repair repository 132 illustrated in FIG. 1) with associations between non-reusable parts and itemized repair estimates identifying specific parts and/or labor operations required to repair collision damage, according to an implementation of the disclosure. For example, repair document repository 250 may include various repair publications associated with various OEMs obtained from various repair publication providers. As alluded to above, repair publications may include repair instructions, diagnostic information, diagrammed repair and replacement procedures, electrical diagrams and training information specific to Year, Make, Model and Engine (YMME) used by repair technicians when repairing a vehicle (e.g., after a collision incident) and may be generated by a variety of OEMs in a variety of file formats. In some embodiments, repair publications may be uploaded into a data store that utilizes a database structure ensuring consistent management and use of repair documents.

Figure 3A:
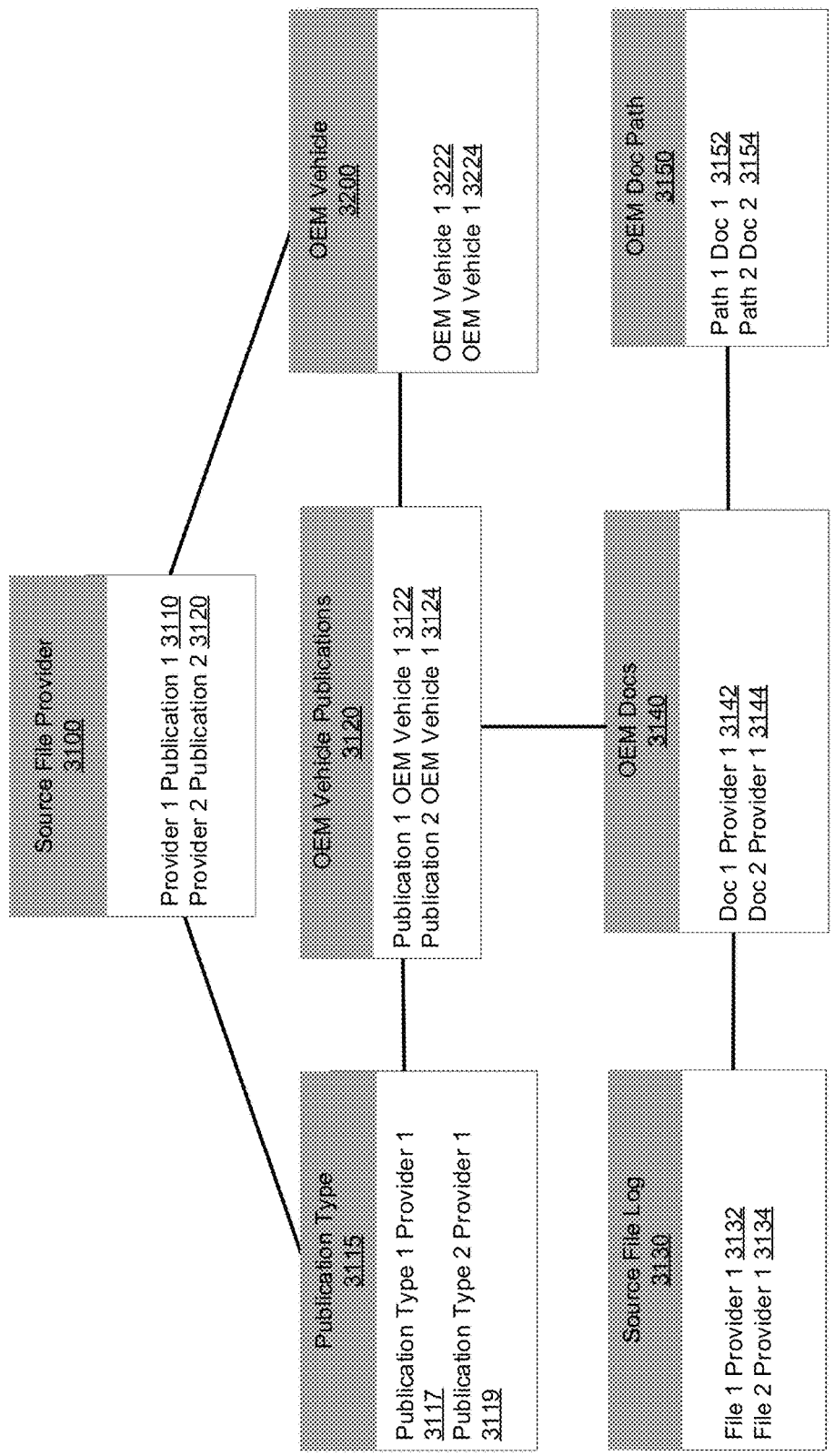
FIGS. 3A-3B illustrate example data structures utilized for storing associations between damaged parts and non-reusable parts, according to an implementation of the disclosure.

In some embodiments, data associated with repair documents may be parsed based on one a plurality of data rules and uploaded to individual tables within repair document repository 250. For example, as illustrated in FIG. 3A, provider information associated with individual publications 1, 2 may be uploaded to a Source File Provider table 3100 as entries 3100, 3120. Next, publication type associated with each publication 1, 2, provided by each provider may be uploaded to a Publication Type table 3115 as entries 3117, 3119. Individual publications 1, 2 associated with each OEM vehicle may be uploaded to OEM Vehicle Publication table 3120 as entries 3122, 3124. OEM Vehicle table 3200 may be prepopulated with data related to OEM Vehicle as entries 3222, 3224. Individual documents 1, 2 included in each publication associated with each OEM vehicle may be uploaded to OEM Docs table 3200 as entries 3222, 3224. Additionally, individual navigation paths 1, 2 that a user (e.g., repair technician) may need to use to access individual documents 1, 2 on the OEM's website may be uploaded to OEM Doc Path table 3120 as entries 3152, 3154. Finally, a log of source files 1, 2 from each provider 1, 2 processed by repair cataloging tool 116 may uploaded to OEM Docs table 3200 as entries 3132, 3134.

Referring back to FIG. 2A, associations between individual repair estimate documents and an repair estimate lines (e.g., parts and/or labor operations) may be recorded within repair document repository 250, at 215. The associations may be generated manually or automatically. In some embodiments, associations between repair documents and repair estimate lines may be stored in accordance with one or more data rules and in individual tables within repair document repository 250.

As alluded to above, the replacement of certain parts identified by the repair estimate lines may require replacement of NRP (i.e., non-reusable parts) in addition to replacement of primary damaged parts. While it may be apparent to some repair technicians of a certain skill level that replacing a particular part necessarily includes replacement of an NRP, not every repair technician may be familiar with such information or have the necessary level of training to recognize this. By omitting the NRPs from the repair estimate lines, may cause delay in the repair process and potentially result in an unsafe vehicle after repairs have been completed, exposing the repair facility to potential liability. Additionally, because non-reusable parts incur their own parts and labor costs, the repair estimate that does not to identify NRPs fails to provide accurate cost estimate of the true expense associated with collision repair.

Accordingly, by associating individual parts and/or labor operations of an itemized repair estimate document with NRPs results in a more accurate repair estimate, which in turn increases repaired vehicle safety and decreased potential liability, as explained above.

Figure 2B:
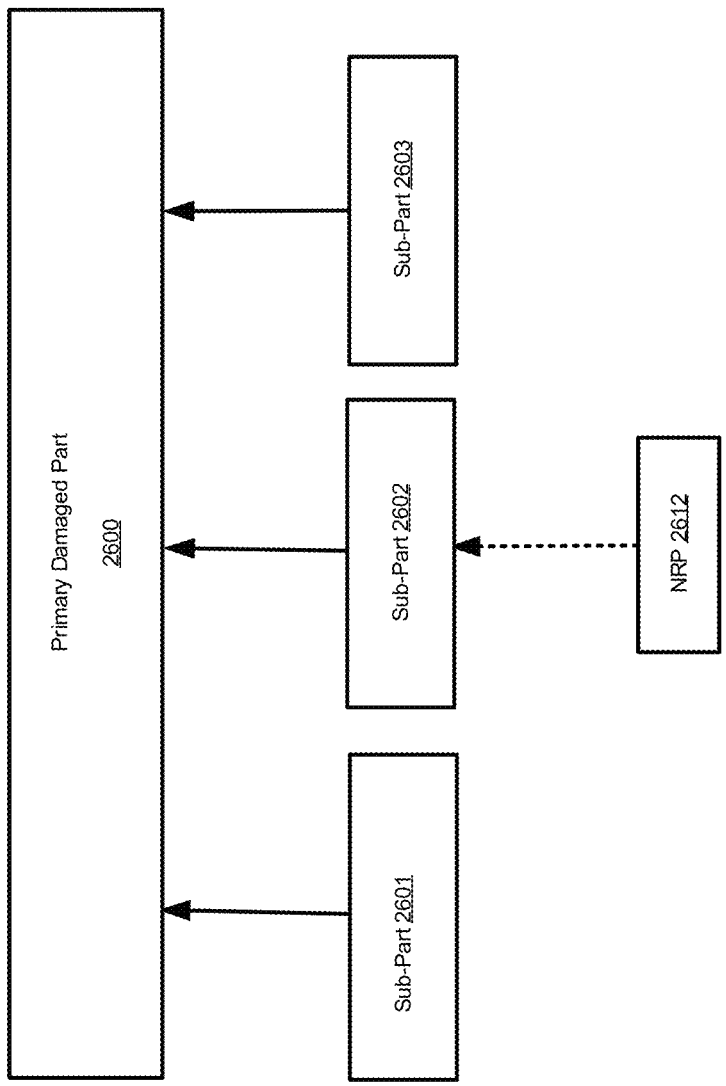
FIG. 2B illustrates a schematic of relationships between damaged parts, according to an implementation of the disclosure.

In some embodiments, the associations between individual parts and NRPs may be determined automatically and/or manually resulting in a one-to-one relationship between damaged parts and NRPs. For example, a damaged part may include a plurality of sub-parts related to the part, as illustrated in FIG. 2B. A primary damaged part 2600 may include a plurality of sub-parts 2601, 2602, 2603 that must be replaced. Additionally, replacement of certain sub-parts may also require replacement of NRPs. For example, sub-part 2602 may require replacement of NRP 2612. The one-to-one association between sup-part 2602 and NRP 2612 may recorded in the document repository 250.

In some embodiments, a database structure may be used to record the associations between the damaged parts and/or sub-parts and NRPs. For example, as illustrated in in FIG. 3B, OEM table 3400 may be prepopulated with data identifying OEMs 1, 2 and their associated document providers 1, 2 as entries 3222, 3224. The associations between repaired vehicle 1, 2 and repair estimate documents 1, 2 may be recorded in a Service table 3300 as entries 3310, 3312. The associations between repaired vehicle 1, 2 and individual data elements of repair estimate documents 1, 2 representing, e.g., parts, labor times, and labor operations, may be recorded in a Service Category Information table 3320 as entries 3322, 3324. Finally, the associations between non-reusable parts (NRP) and individual data elements of the repair estimate documents (e.g., parts, labor times, and labor operations), as alluded to above, may be recorded in an NRP Mapping table 3600. In particular, non-reusable part 1 may be associated with estimate 1 in an entry 3610, and NRP 2 may be associated with estimate 1 in an entry 3612. Similarly, NRP 2 may be associated with estimate 2 in an entry 3614, and NRP 2 may be associated with estimate 2 in an entry 3616. the association between NRP 1 and estimate 1 (recorded in table 3600 as line item 3610, for example) may also be associated with service information 1 and vehicle 1. That is because estimate 1 is associated with repair vehicle 1 (recorded in table 3300 as line item 3310) and vehicle 1 may be associated with service information 1 (recorded in table 3320 as line item 3320).

Components of the Process Linking NRPs to Damaged Parts

Figure 4:
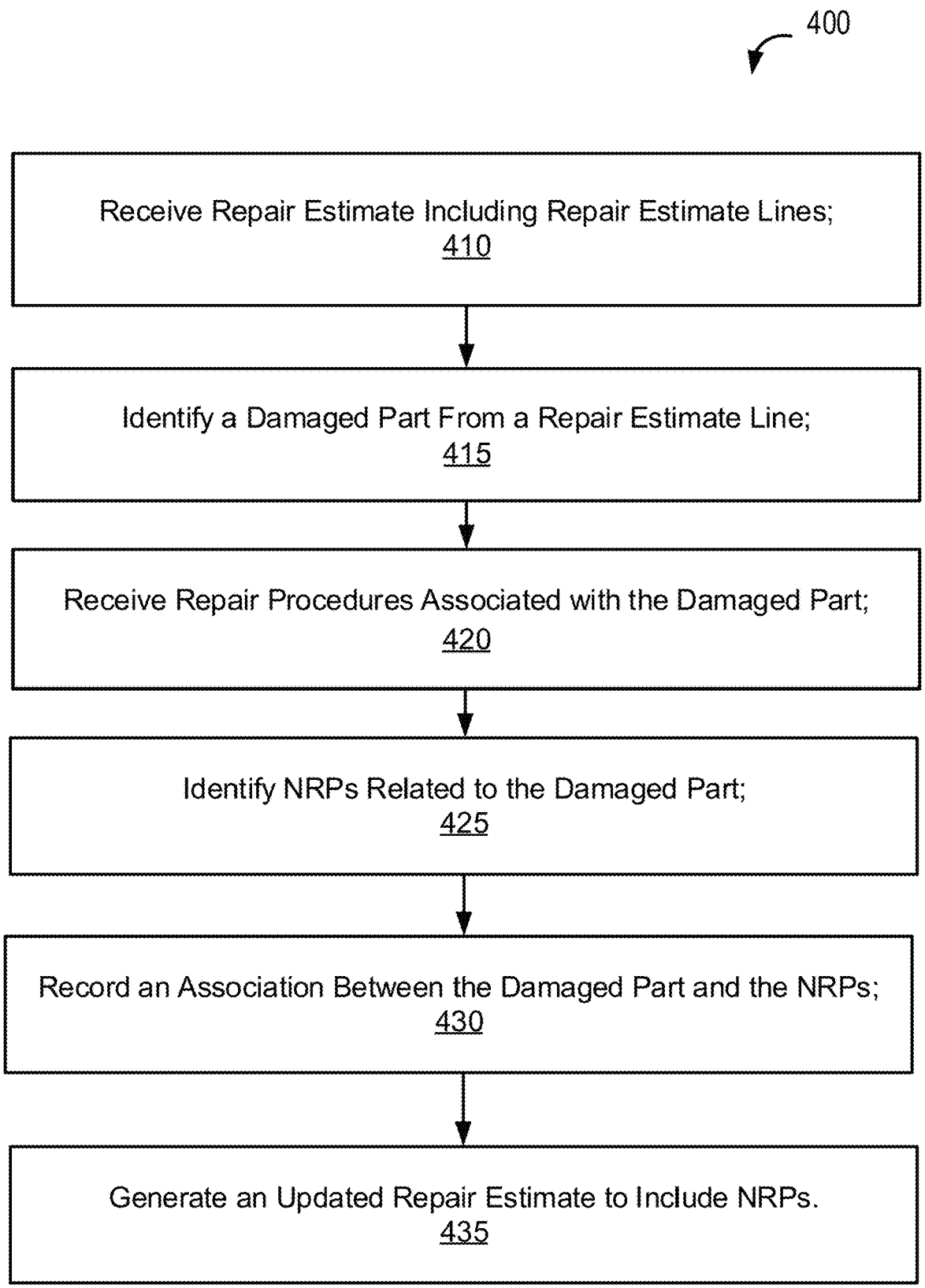
FIG. 4 illustrates example components of a process for managing associations between damaged parts and non-reusable parts, according to an implementation of the disclosure.

FIG. 4 illustrates example process of associating damaged parts identified by a repair estimate line with NRPs, according to an implementation of the disclosure. As mentioned above, in some embodiments, some or all associations between damaged part (i.e., identified by the labor operation) and NRP may be determined using a machine learning model. Other artificial intelligence techniques may be used instead of, or in addition to, using a machine learning model. By virtue of utilizing a machine learning approach enhances the automated mapping process described herein. In particular, by using machine learning model, allows the NRP mapping tool (e.g., mapping tool 126 illustrated in FIG. 1) to associate damaged parts to NRPs (i.e., parts not identified solely by the labor operation). The process 400 may include providing a machine learning model, at 401. The machine learning model may be any machine learning mode, algorithm, or an Artificial Intelligence (AI) technique, capable of the functions described herein.

As illustrated in FIG. 4, a process 400 may begin at 410 by receiving a repair estimate from collision repair estimating server (e.g., repair collision estimating server 144 illustrated in FIG. 1). Next, at 415, the repair estimate may be used to identify individual damaged parts. For example, individual damaged parts may be included in repair estimate lines. At 420, OEM repair procedures specific to Year, Make, Model and Engine (YMME) of the damaged vehicle may be received. For example, the repair procedures may be received by using the vehicle identification information included in the repair estimate.

Next, at 425, the repair procedures related to the damaged part may be used to identify the NRPs when repairing/replacing the damaged part.

In some embodiments, process 400 may include a pre-processing step. The pre-processing step may include data preparation and/or data relevancy analysis. For example, pre-processing step may include curating of a corpus (e.g., a collection of repair documents) using standard natural language algorithmic techniques such as stemming/lemmatization/stop words/HTML Tags removal/common words and can be achieved using a myriad of Natural Language Processing (NLP) tools (e.g., Beautiful Soup, NLTK, GENSIM, etc.).

Additionally, process 400 may include training the machine learning model, at 425. For example, specific keywords, phrases, images, repair document title, and/or other data elements, for the previously associated repair documents may be applied as inputs to the machine learning model. Training the machine learning model may include supervised learning, unsupervised learning, or combinations thereof. During the training stage, process 400 may include the machine learning model storing the values related to the decisions made during the training stage in a decision model database.

After training, the machine learning model may be used to associate "unlabeled" data, i.e., any damaged part identified by estimate line item, including labor operations and described in an OEM repair procedure document. The machine learning model may utilize the decision data values that are determined to be related to data in the repair document (e.g., based on part name, vehicle name, document title, YMME, etc.) from a decision model database when determining the new associations between an unmapped damaged part and NRPs for any vehicle and any vehicle part and/or labor operation, at 425. For example, the machine learning model may identify keyword and phrases in the repair document and determine if matches exist between the values stored in decision model database when making the determination. Depending on match reliability, the machine learning model may create accurate associations for unlabeled damaged parts.

Figure 3B:
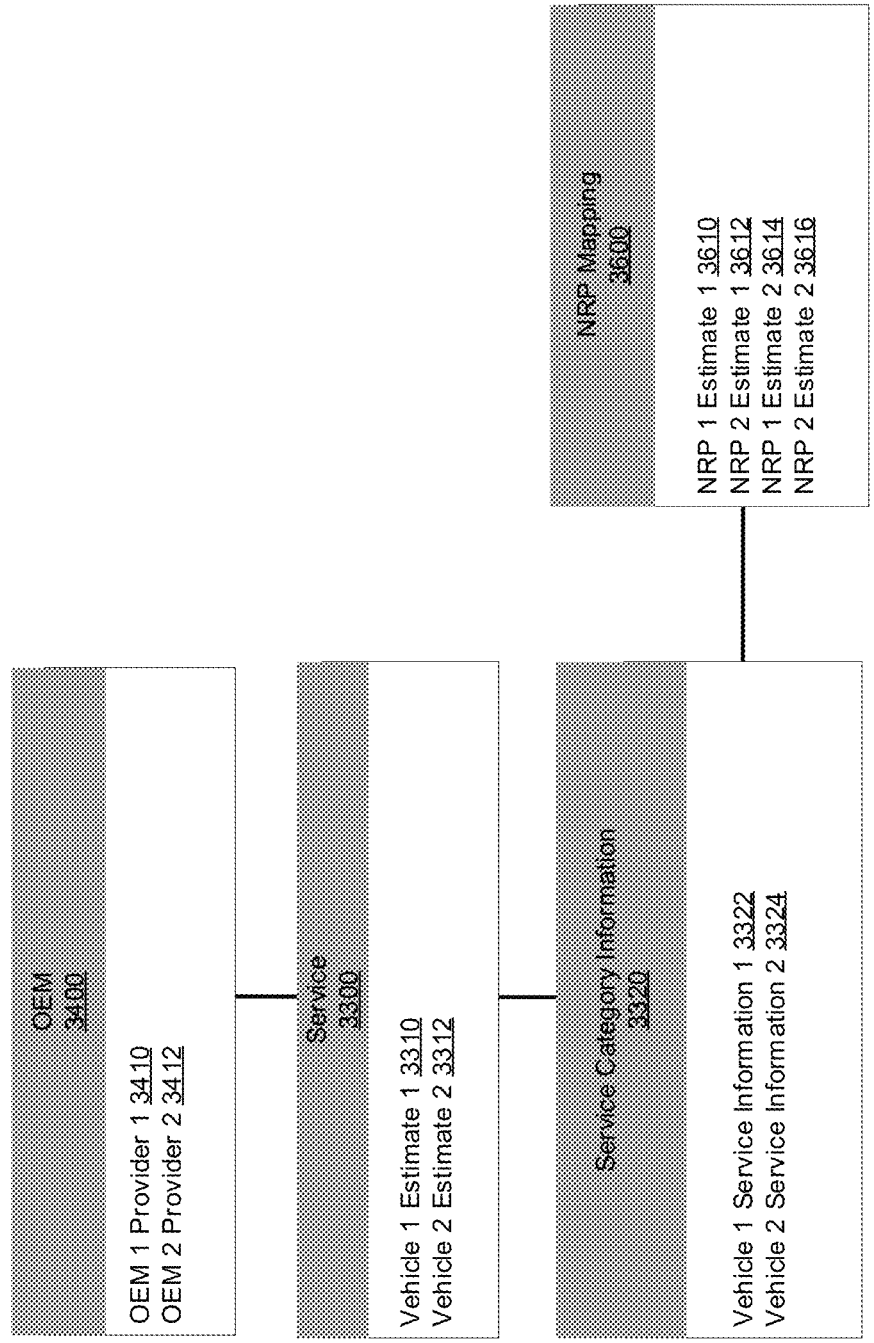

Next, at 430, the association between the identified NRP and the damaged part may be recorded in the document repository (e.g., in the NRP Mapping table 3600 illustrated in FIG. 3B). Finally, at 430, an updated repair estimate may be generated. The updated repair estimate may include NRPs identified at 425.

In some embodiments, process 400 may include a quality control phase beginning by a user selecting, from document repository 440, association suggestions and/or actual associations between damaged parts and NRPs determined by the machine learning algorithm and manually verifying the accuracy of the machine learning determination. Those associations determined by the user as inaccurate may be rejected. By contrast, those associations the user deems as accurate or otherwise acceptable may be accepted. In some embodiments, the user may complete the mapping process started by the machine learning algorithm. In some embodiments, the user accepted associations from the machine learning algorithm may be further used for relearning and as re-tuning the machine learning model for enhanced accuracy of future predictions.

In cases where associations determined by process 400 are inaccurate, the user may manually reject the associated mapping and that rejected associated mapping may in turn be fed back to the model for further relearning and as re-tuning the machine learning model for enhanced accuracy of future predictions. The relearned model may then be redeployed and utilized again to update and complete the mapping process with enhanced precision.

Collision Repair Estimating Tool

Figure 5A:
FIGS. 5A-5B illustrate an example graphical user interface of a collision repair estimating tool, according to an implementation of the disclosure.
Figure 5B:
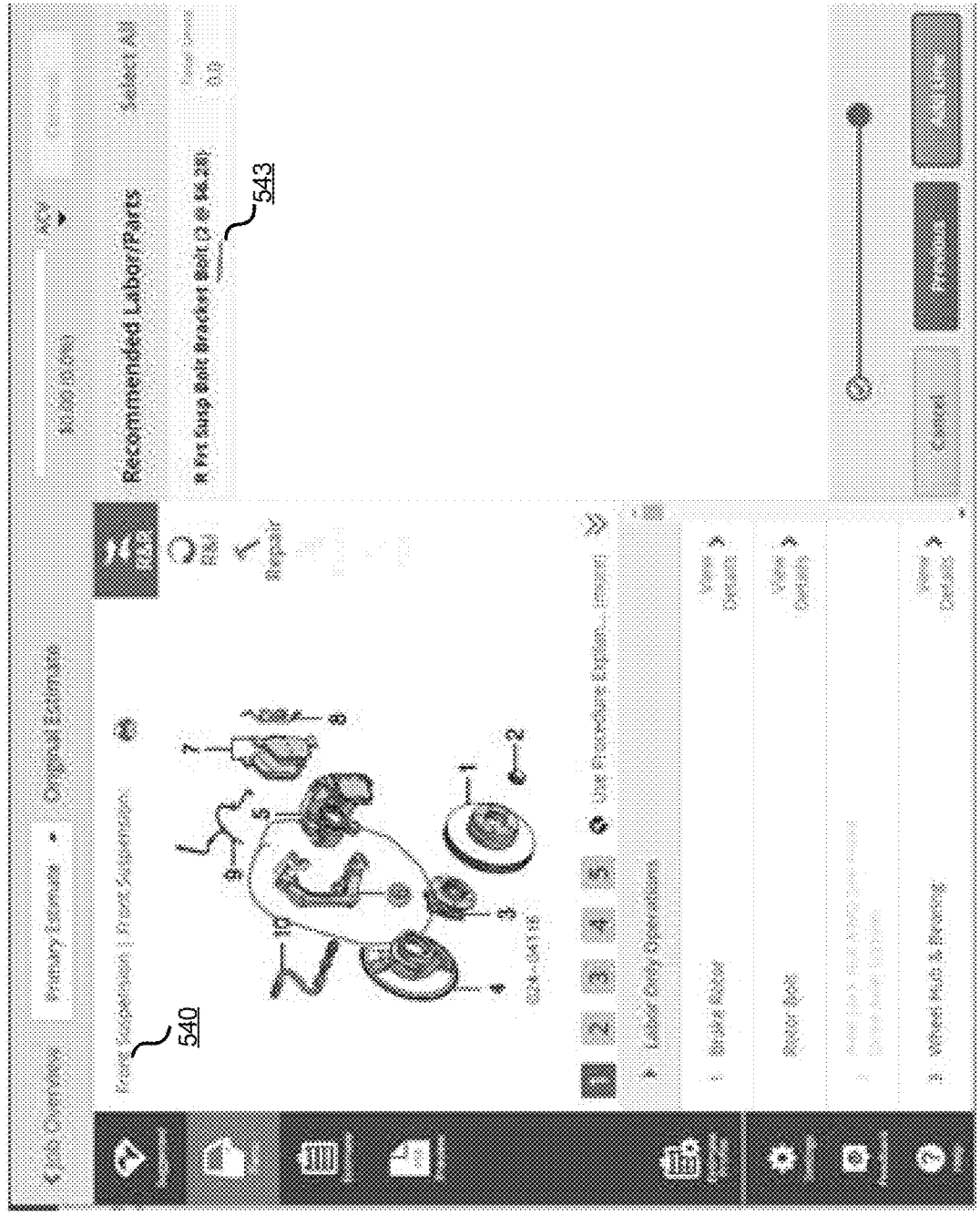

FIGS. 5A-5B illustrate collision repair estimating tool (e.g., collision repair estimating tool 146 illustrated in FIG. 1) that utilizes associated damaged parts to NRPs, as described herein during a repair estimating process. For example, FIG. 5A illustrates a job overview 501 generated by the repair estimating tool 146 according to some embodiments of the disclosed technology. Referring to FIG. 5A, the job overview 501 provides information describing the vehicle, the vehicle owner, the vehicle owner's insurance policy, the repair status of the vehicle, any attachments associated with the estimate, and the like. For example, vehicle owner information screen 510 may include the vehicle owner's name, address, contact information, and the like. The vehicle information screen 515 may include the year, make, and model of the vehicle, as well as the submodel, color, license plate number, whether the vehicle is drivable, and the like. The insurance information screen 520 may include the policy number, claim number, deductible amounts, contact information for the claim adjuster, and the like. The repair status screen 525 information may include when the vehicle is due into the auto repair shop, when the repair is estimated to be complete, and the like. The attachment information screen 530 may include photos 531 of the vehicle, a summary of the owner's insurance policy, and the like. The collision repair estimating tool 146 also allows a user to download an existing estimate by clicking the "Download" button 512, to begin writing an estimate, by clicking the "Write Estimate" button 514, or to add to existing estimate, by clicking the "Add Existing Estimate" button 516.

FIG. 5B illustrates a primary repair estimate view 507 generated by the collision repair estimating tool 146 according to some embodiments of the disclosed technology. In this view 503, a user has selected labor operation for repairing or replacing "Front Suspension" 540. The labor operation 540 includes parts 1-6, which the user can add to the estimate. Additionally, collision repair estimating tool 146 identifies Rear Front Suspension Bolt Bracket Bolt 543 as required part. However, part 543 is not the original suspension part 540 but rather is NRP, generated by the collision repair estimating tool 146 by virtue of being determined to be associated to damaged part 540.

General Computer System

Figure 6:
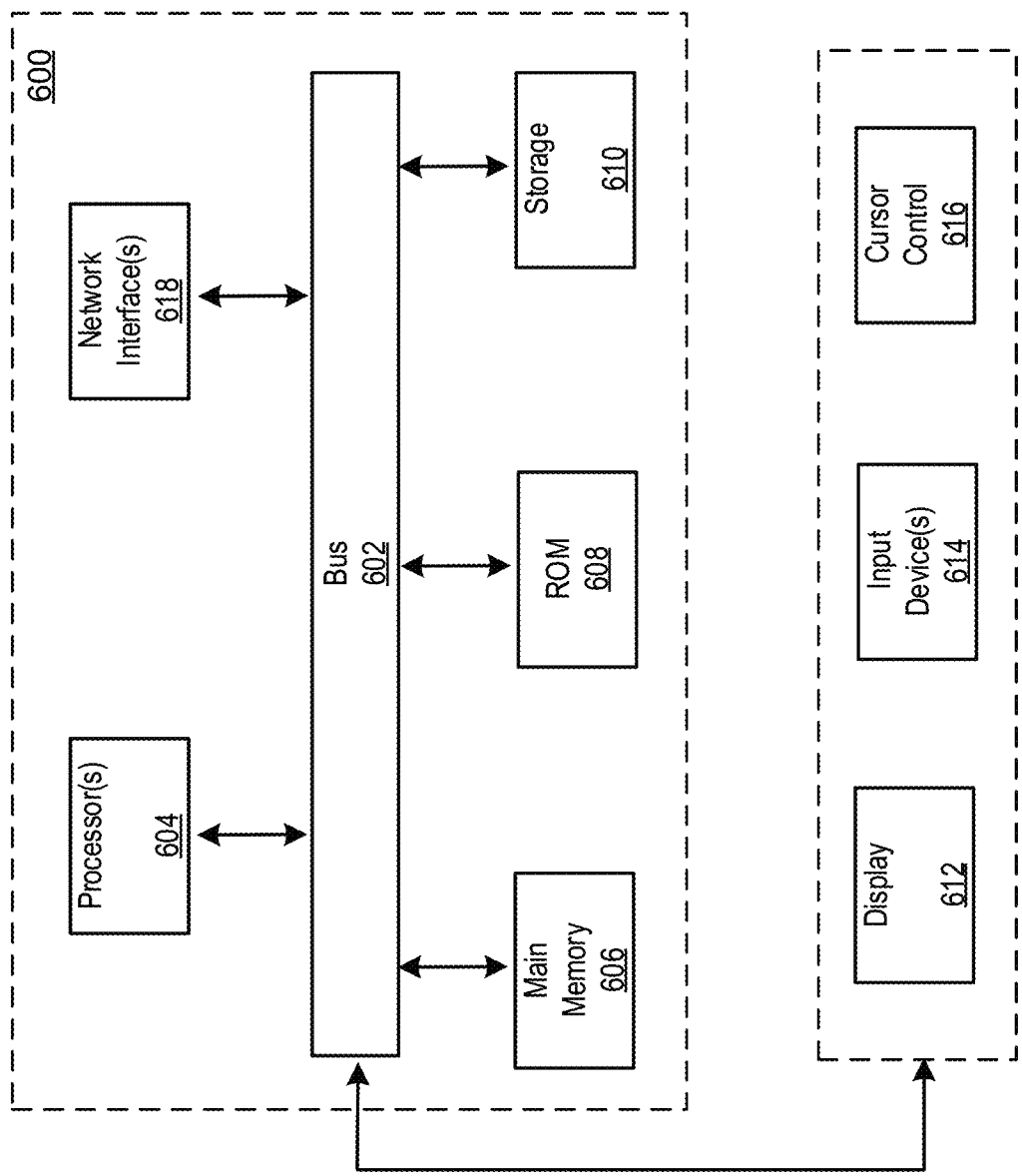
FIG. 6 illustrates an example computing system that may be used in implementing various features of embodiments of the disclosed technology.

FIG. 6 depicts a block diagram of an example computer system 600 in which various of the embodiments described herein may be implemented. The computer system 600 includes a bus 602 or other communication mechanism for communicating information, one or more hardware processors 604 coupled with bus 602 for processing information.

Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a transparent heads-up display (HUD) or an optical head-mounted display (OHMD), for displaying information to a computer user. An input device 614, including a microphone, is coupled to bus 602 for communicating information and command selections to processor 604. An output device 616, including a speaker, is coupled to bus 602 for communicating instructions and messages to processor 604.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. Components may also be written in a database language such as SQL and/or handled via a database object such as a trigger or a constraint. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 605. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 605. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire, and fiber optics, including the wires that comprise bus 602. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment. Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method implemented by a server computer, the method comprising:
    training a machine learning algorithm for determining associations between one or more primary parts of a vehicle and non-reusable parts used to repair the one or more primary parts based on at least previously determined associations between primary parts and non-reusable parts used to repair more primary parts of a first vehicle;
    executing the trained machine learning algorithm on receiving, from a data repository, at least one repair estimate record specifying one or more primary parts of a second vehicle affected in a collision event, and on receiving, from the data repository, one or more repair documents specifying instructions for repairing the one more primary parts of the second vehicle specified by the at least one repair estimate record to determine associations between the one or more primary parts and non-reusable parts used to repair the one or more primary parts of the second vehicle;
    recording the determined association between the one or more primary parts and non-reusable parts in the data repository;
    generating an updated the at least one repair estimate record; wherein the updated the at least one repair estimate record specifies the one or more non-reusable parts associated with the one or more primary parts of the second vehicle affected in the collision event;
    verifying the determined associations between the one or more primary parts and non-reusable parts; and
    using feedback generated by the verification for future training of the machine learning algorithm for determining the associations between the one or more primary parts and the non-reusable parts used to repair the one or more primary parts.

2. The method of claim 1, wherein the one or more primary parts are damaged during the collision event.

3. The method of claim 2, wherein the one or more non-reusable parts are not damaged during the collision event.

4. The method of claim 3, wherein repairing the vehicle affected in the collision event comprises replacing the one or more primary parts, and wherein replacing the one or more primary parts comprises replacing the one or more non-reusable parts.

5. The method of claim 1, the method further comprising: extracting vehicle information from the at least one repair estimate record.

6. The method of claim 5, wherein the vehicle information comprises a year, a make, a model, and an engine of the second vehicle.

7. The method of claim 6, wherein receiving the one or more repair documents comprises determining the one or more repair documents associated with the at least one repair estimate records based on the vehicle information.

8. A system, comprising:
    a hardware processor; and
    a non-transitory machine-readable storage medium encoded with instructions executable by the hardware processor to perform a method comprising:
    training, by a computing device, a machine learning algorithm for determining associations between one or more primary parts of a vehicle and non-reusable parts used to repair the one or more primary parts based on at least previously determined associations between primary parts and non-reusable parts used to repair one or more primary parts of a first vehicle;
    executing, by the computing device, the trained machine learning algorithm on receiving, from a data repository, at least one repair estimate record specifying one or more primary parts of a second vehicle affected in a collision event; and on receiving, from the data repository, one or more repair documents specifying instructions for repairing the one more primary parts of the second vehicle specified by the at least one repair estimate record to determine associations between the one or more primary parts and non-reusable parts used to repair the one or more primary parts of the second vehicle;
    recording the determined association between the one or more primary parts and non-reusable parts in the data repository;
    generating an updated the at least one repair estimate record; wherein the updated the at least one repair estimate record specifies the one or more non-reusable parts associated with the one or more primary parts of the second vehicle affected in the collision event;
    verifying the determined associations between the one or more primary parts and non-reusable parts; and
    using feedback generated by the verification for future training of the machine learning algorithm for determining the associations between the one or more primary parts and the non-reusable parts used to repair the one or more primary parts.

9. The system of claim 8, wherein the one or more primary parts are damaged during the collision event.

10. The system of claim 9, wherein the one or more non-reusable parts are not damaged during the collision event.

11. The system of claim 10, wherein repairing the vehicle affected in the collision event comprises replacing the one or more primary parts, and wherein replacing the one or more primary parts comprises replacing the one or more non-reusable parts.

12. The system of claim 8, the method further comprising: extracting vehicle information from the at least one repair estimate record.

13. The system of claim 12, wherein the vehicle information comprises a year, a make, a model, and an engine of the second vehicle.

14. The system of claim 13, wherein receiving the one or more repair documents comprises determining the one or more repair documents associated with the at least one repair estimate records based on the vehicle information.

15. A non-transitory machine-readable storage medium encoded with instructions executable by a hardware processor of a computing component, the machine-readable storage medium comprising instructions to cause the hardware processor to perform a method comprising:
  training a machine learning algorithm for determining associations between one or more primary parts of a vehicle and non-reusable parts used to repair the one or more primary parts based on at least previously determined associations between primary parts and non-reusable parts used to repair one or more primary parts of a first vehicle;
  executing the trained machine learning algorithm on receiving, from a data repository, at least one repair estimate record specifying one or more primary parts of a second vehicle affected in a collision event, and on receiving, from the data repository, one or more repair documents specifying instructions for repairing the one more primary parts of the second vehicle specified by the at least one repair estimate record to determine associations between the one or more primary parts and non-reusable parts used to repair the one or more primary parts of the second vehicle;
  recording the determined association between the one or more primary parts and non-reusable parts in the data repository;
  generating an updated the at least one repair estimate record; wherein the updated the at least one repair estimate record specifies the one or more non-reusable parts associated with the one or more primary parts of the second vehicle affected in the collision event;
  verifying the determined associations between the one or more primary parts and non-reusable parts; and
  using feedback generated by the verification for future training of the machine learning algorithm for determining the associations between the one or more primary parts and the non-reusable parts used to repair the one or more primary parts.

16. The non-transitory machine-readable storage medium of claim 15, wherein the one or more primary parts are damaged during the collision event.

17. The non-transitory machine-readable storage medium of claim 16, wherein the one or more non-reusable parts are not damaged during the collision event.

18. The non-transitory machine-readable storage medium of claim 17, wherein repairing the vehicle affected in the collision event comprises replacing the one or more primary parts, and wherein replacing the one or more primary parts comprises replacing the one or more non-reusable parts.

19. The non-transitory machine-readable storage medium of claim 15, the method further comprising: extracting vehicle information from the at least one repair estimate record.

20. The non-transitory machine-readable storage medium of claim 19, wherein the vehicle information comprises a year, a make, a model, and an engine of the second vehicle.

21. The non-transitory machine-readable storage medium of claim 20, wherein receiving the one or more repair documents comprises determining the one or more repair documents associated with the at least one repair estimate records based on the vehicle information.

* * * * *